United States Patent Office 3,420,182
Patented Jan. 7, 1969

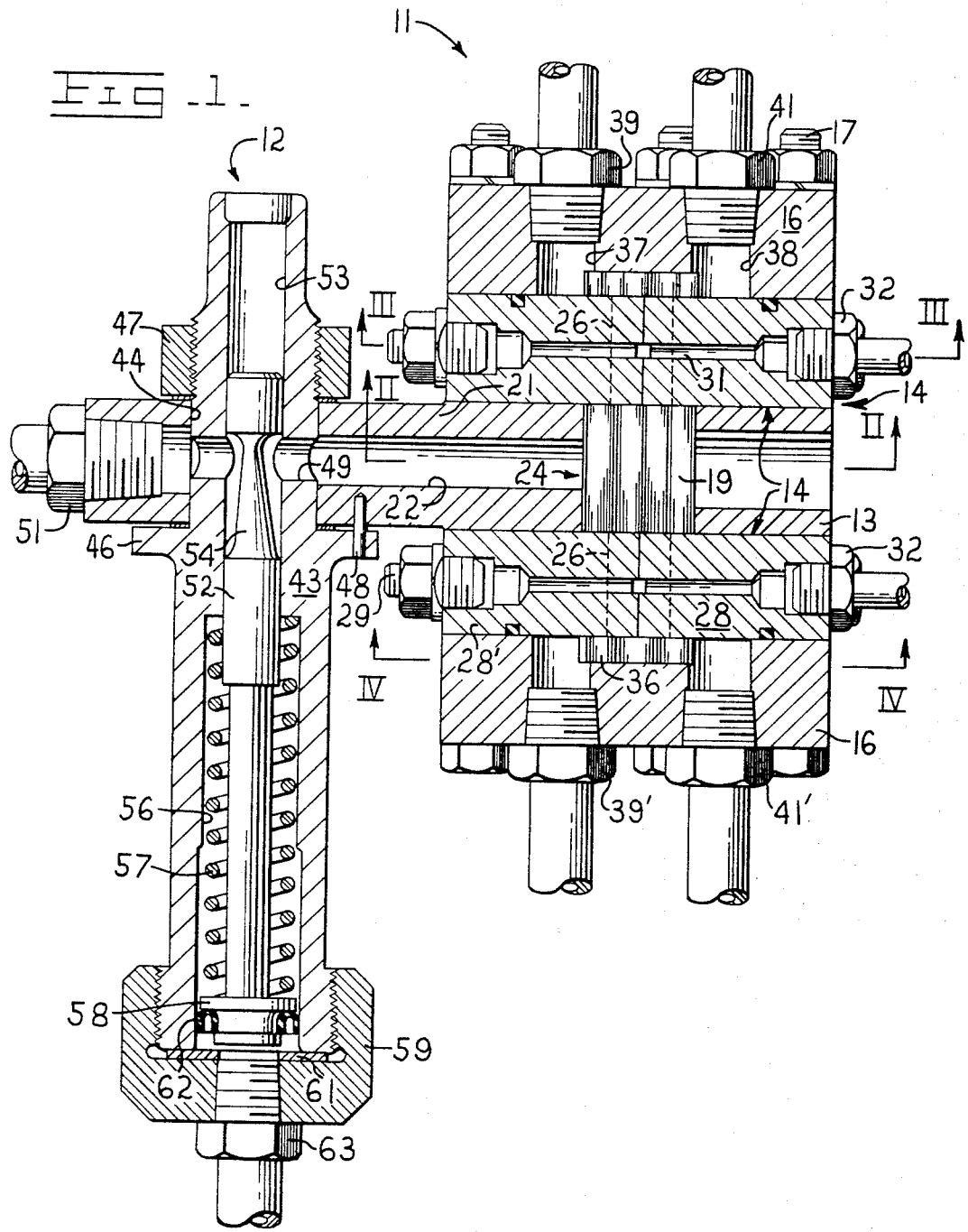

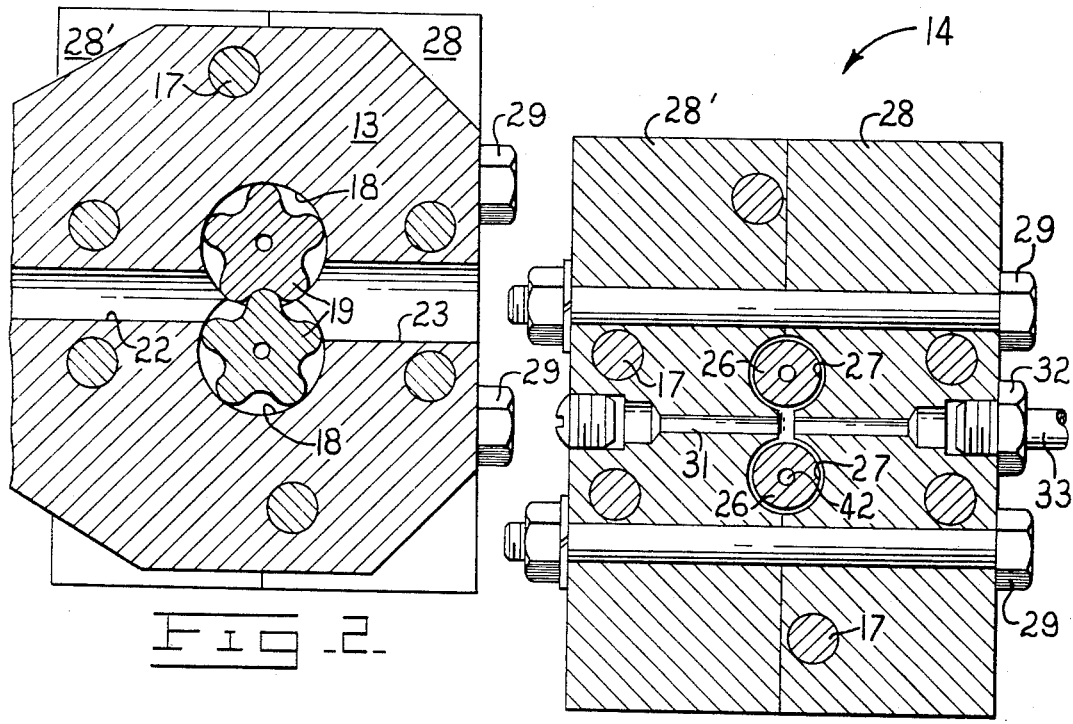
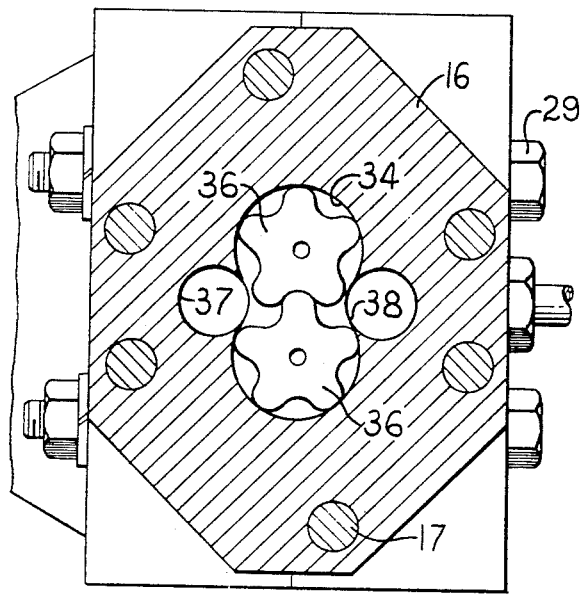
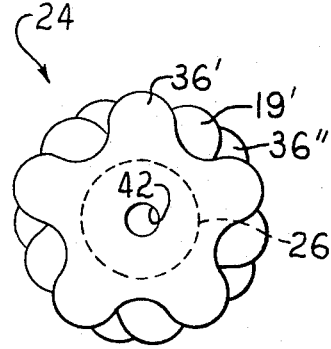

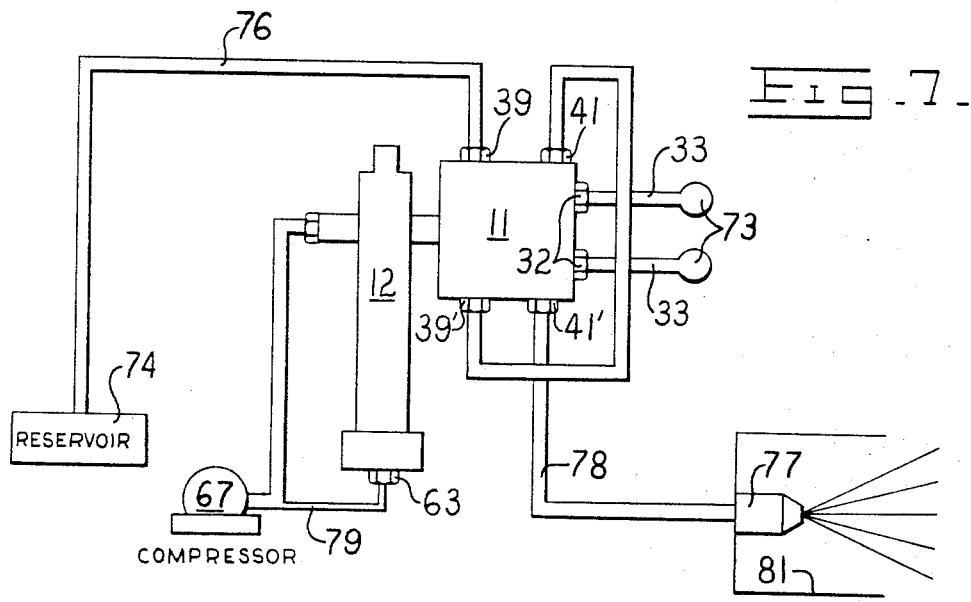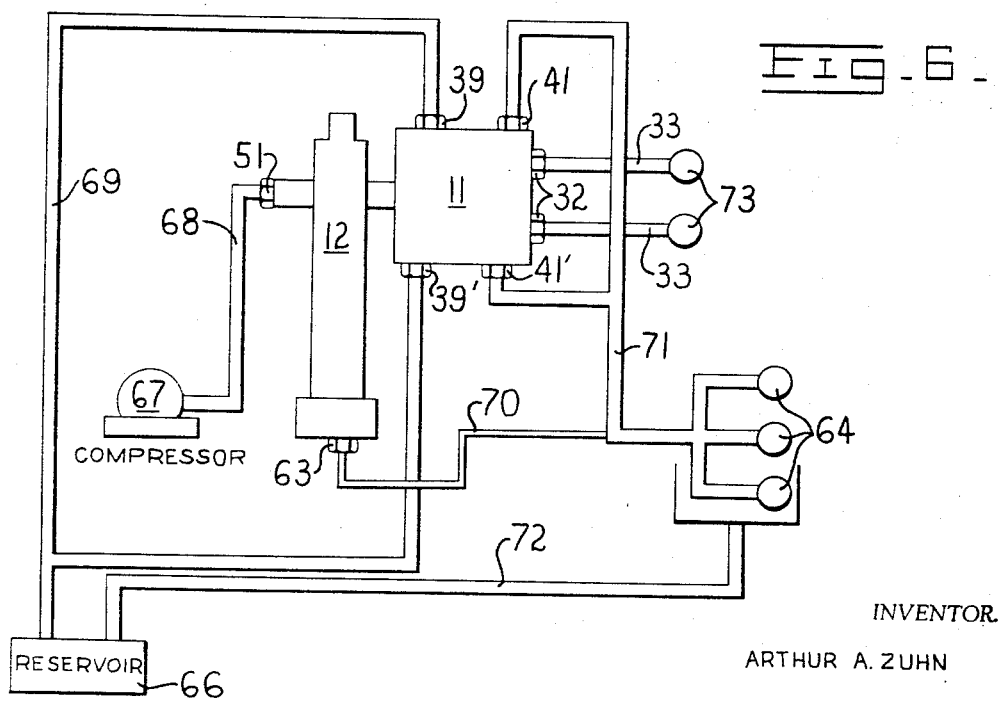

3,420,182
FLUID OPERATED PUMPING COMPONENT FOR ENGINES AND MOTOR DRIVEN APPARATUS
Arthur A. Zuhn, East Peoria, Ill., assignor to Caterpillar Tractor Co., Peoria, Ill., a corporation of California
Filed Nov. 2, 1966, Ser. No. 591,507
U.S. Cl. 103—13      4 Claims
Int. Cl. F04b 49/00; F04b 35/00

ABSTRACT OF THE DISCLOSURE

A compact and versatile liquid pump for supplying oil, fuel, or the like to components of an engine is comprised of a unitary assembly having a fluid motor driving a pair of pumps, which may be parallel or series connected, together with a control valve which varies the flow of driving fluid to the motor as a function of a fluid pressure applied to a control input.

---

This invention relates to fluid pumping devices and more particularly to pumps of the class used for supplying liquids, such as lubricating oil, fuel, and the like, to components of a motor or apparatus driven thereby.

Many mechanisms require one or more pumps for the purpose of supplying liquids to different regions of the mechanism, the oil pumps and fuel pumps of internal combustion engines being typical examples. Air compressors are an example of motor driven mechanism in which a lubricating oil pump may be used.

It has heretofore been the practice to drive such pumps through some form of mechanical coupling with rotating elements of the associated mechanism. However the use of mechanically driven pumps for this purpose creates serious problems and inefficiencies. The lubricating oil pump of an engine, for example, is customarily driven from the engine crank shaft through a gear train. This practice complicates engine design, adds to bulk, cost, and maintenance problems, and places severe limitations on the physical location of the pump on the engine. In designing an engine, it is often very difficult to find a suitable location for positioning the oil pump in the drive train. The same considerations apply to the engine fuel pump. These problems are particurlary pronounced in certain relatively new types of power systems such as gas turbine engines.

Where pumps of this type are mechanically coupled to the engine or driven mechanism in a positive manner, a very serious inefficiency may be present. Generally there is a maximum output pressure which is acceptable. With the pump directly and positively coupled to a rotating element of the engine the pump output pressure necessarily will vary in accordance with the speed of the engine. Accordingly, to avoid overpressures, it has been the practice to include a relief valve in the pump which opens when the output pressure reaches the predetermined limit. However the power expended in pumping through the open relief valve is wasted and this can be a significant factor in engine efficiency.

This power loss is aggravated by the techniques heretofore used to avoid insufficient pressure. It has been the practice to use a pump of sufficient capacity to provide the desired output pressure at the lowest engine speeds. However, this large pumping capacity means that the relief valve will be almost continuously open at the higher speeds at which the engine usually operates. Thus the normal condition is that substantial power is being wasted to pump through the relief valve and this condition is accompanied by heating and foaming of the liquid.

Still another disadvantageous characteristic of mechanically driven oil pumps in this context is that the flow of oil delivered to bearings or other components supplied by the pump will vary as bearing clearances increase from wear. As the flow rate is determined by the speed of the driving connection to the pump, rather than the rate of loss at the elements being supplied, this condition can result in insufficient oil being delivered to the bearings.

The several undesirable effects discussed above all result in part from operating the pump through a mechanical connection with rotating elements of the motor or associated mechanism. The present invention meets each of these problems by dispensing with any positive mechanical drive and utilizing a fluid operated pump which may be driven pneumatically or from any other source of high pressure gas or liquid which may be available in the motor or motor driven mechanism. To make the pumping rate or output pressure independent of extraneous variables such as pressure variations in the source of driving fluid, a control valve coacts with the pump. The control valve regulates the input of driving fluid to the pump and my itself be controlled in any of several ways to provide for desired pumping characteristics.

The driving fluid input control valve may be coupled to the pump output and made responsive to the output pressure so that a feedback loop is formed which maintains the pump output pressure at a constant predetermined value. In another arrangement, the valve may be controlled through a connection to the source of driving fluid so that variations in driving fluid pressure are cancelled out at the input to the pump. In still another arrangement, the valve may be controlled by a governor so that the pumping rate is made responsive to engine speed as in a conventional system where this mode of operation is desirable.

Consistent with the flexibility of control arrangements as discussed above, the pump may be designed with dual pumping chambers which may be connected in parallel to provide a maximum pumping rate and which may be reconnected in an alternate series arrangement to provide for higher output pressures or to handle more viscous liquids.

This pumping system greatly simplifies engine design in that it is unnecessary to find a location for positioning the pump in the engine drive train. The pump may be located at any point where it is most convenient and may in fact be situated apart from the engine proper where this may be desirable. By controlling the pump through the medium of the driving fluid, rather than utilizing relief valves to limit output pressure, greater efficiency is realized and heating and foaming of the oil, fuel, or other liquid, is minimized. The pumping rate or output pressure need not be affected by changes in bearing clearances or other variables at the output end of the system.

Accordingly, it is an object of this invention to provide a more versatile pumping mechanism for supplying fluids to components of a motor or motor driven apparatus.

It is another object of this invention to provide a pump for translating fluids, such as lubricating oil, fuel, or the like, in an engine or apparatus driven thereby which may be located at any desired position with respect to the engine without structural or operting complications.

Still another object of this invention is to provide a pumping device for supplying liquids to components of a motor or motor driven mechanism without requiring a mechanical driving connection between the motor and the pumping device.

It is still another object of this invention to increase the efficiency of pumps used in conjunction with engines for such purposes as translating lubricating oil or fuel.

It is still another object of the invention to provide a compact highly efficient engine operated pumping mechanism and control therefor which may readily be connected to provide any of a variety of diverse modes of operation.

It is still another object of this invention to provide a pumping mechanism for supplying lubricating oil to moving elements of an engine which may readily be arranged to maintain a constant output pressure irrespective of bearing wear or other changes at the output of the system.

The invention, together with further objects and advantages thereof, will best be understood by reference to the following specification taken in conjunction with the accompanying drawings of which:

FIG. 1 is a section view taken along a central plane through a pump and control therefor embodying the invention;

FIG. 2 is a cross section view taken along line II—II of FIG. 1 further illustrating the structure of elements which drive the pump;

FIG. 3 is a cross section view taken along lines III—III of FIG. 1 showing additional structure of the pumping mechanism;

FIG. 4 is a cross section view taken along line IV—IV of FIG. 1 showing gear pump elements of the mechanism thereof;

FIG. 5 is an end view of a gear shaft of the mechanism of FIG. 1 illustrating the interrelationship of the gears formed thereon;

FIG. 6 is a schematic diagram showing one mode of interconnecting the mechanism of FIG. 1 in an engine where the mechanism is to function as a lubricating oil pump; and FIG. 7 is a schematic diagram showing the mechanism connected to function as a fuel pump in an engine.

Referring now to the drawings and more particularly to FIG. 1 thereof, there is shown a pump 11 with control valve mechanism 12 adaptable for functioning as a lubricating oil pump, fuel pump, or for other purposes as will hereinafter be discussed in greater detail. The body of pump 11 is formed by a flat center member 13, a pair of bearing block assemblies 14 disposed one on each side thereof and a pair of flat end members 16 disposed against opposite ones of the blocks 14, the several members being secured together by through-bolts 17. Referring now to FIG. 2 in conjunction with FIG. 1, a pair of overlapping circular cavities 18 are formed within the center member 13 to receive a pair of gears 19 which engage at the overlapping region of the two cavities to function as a fluid driven gear motor. Center member 13 has an extension 21 at one side with an air input passage 22 which connects with the overlapping region of the two cavities 18. A larger air outlet passage 23 extends from the opposite side of such region in alignment with passage 22.

Referring now to FIG. 3 in conjunction with FIG. 1, each of the gears 19 is formed integrally at the central section of a separate one of a pair of parallel gear spindles 24. Each spindle 24 has smaller diameter sections 26 on opposite sides of the gear 19 which extend axially therefrom through bores 27 in each of the adjacent bearing block assemblies 14. In order to provide for assembly of the above described structure, each block 14 is formed of two separate sections 28 and 28' held together by cross bolts 29, the division being along a plane containing the axes of the two gear spindles 24.

The sections 26 of gear spindle 24 which journal the spindle in bearing block assemblies 14 are lubricated by liquid which leaks through bores 27 from the pumping chambers within end members 16. Excess liquid at sections 26 is drained by passages 31 in each bearing block assembly 14 which connect the central region of bores 27 with drain fittings 32 at the sides of each block.

Fittings 32, through suitable tubing 33, may variously transmit the liquid to a disposal point or may return the liquid to the pump inlet or some other portion of the liquid system.

Two pumping regions are provided, one being in each of the end members 16, which among advantages provides for either series or parallel connection according to whether a high pumping pressure or a high pumping rate is the primary consideration.

Referring now to FIG. 4 in conjunction with FIG. 1, each end member 16 has a pair of overlapping cylindrical cavities 34 in which gears 36 turn, the gears being engaged in the overlapped region of the two cavities to form a gear pump in conjunction therewith. Gears 36 are integrally formed on each end of the two gear spindles 24 and thus are turned by the hereinbefore described motor action of the gears 19 at the central portion of the spindle.

To provide for the passage of liquid to be pumped through the gears 36, an inlet passage 37 and an outlet passage 38 in each end member 16 communicate with the overlapping region of the two cavities 34 at opposite sides of the gears 36. Inlet and outlet fittings 39 and 41 connect with passages 37 and 38 respectively, at one of the end members 16, and a similar set of fittings 39' and 41' connect with such passages at the other end member 16.

With reference to FIGS. 1 to 4 in conjuction, pump 11 is operated by admitting high pressure air or another fluid available in the engine, into passage 22 of center member 13. The driving fluid acts to turn gears 19 with the rotary motion being transmitted through gear spindles 24 to the pumping gears 36 in end members 16. Each set of gears 36 then functions to pump liquid from inlets 37 to outlets 38.

As described above, each of the gear spindles 24 carries three different gears, one of the drive gears 19 and two of the pumping gears 36. To distribute torque impulses on the gear spindles 24, it is preferably that the three sets of gear teeth on each spindle be out of alignment as illustrated in FIG. 5. Thus in a construction such as that of the present embodiment in which each gear nents of said mechanism comprising, a pump having a 19 and 36 has five teeth, the teeth 19' of gear 19 are offset angularly from the teeth 36' of one of the gears 36 by twenty-six degrees. The teeth 36" of the second or opposite gear 36 are similarly offset twenty-six degrees in an angular direction from each of the other two sets of teeth. In order to eliminate any axial force on the gear spindles 24 from pressure differences in the two end members 16, a passage 42 extends axially through each such spindle.

Referring now again to FIG. 1, in the absence of control 12, the pump 11 would be responsive to such factors as pressure changes in the driving air supplied to passage 22. Provided other factors were constant, the pumping rate or output pressure would increase if such air pressure increases and vice versa. As has hereinbefore been discussed, this condition may not necessarily be desirable in that it may require that relief valves be provided which in turn give rise to substantial inefficiencies. To free the pump from sensitivity to such pressure changes as well as sensitivity to other variables, the driving air is supplied to passage 22 through the control valve 12.

Valve 12 is of the type providing a flow passage which varies in accordance with the magnitude of a fluid pressure applied to an element of the valve for control purposes. The valve has a tubular body 43, one end of which is transpierced through a bore 44 in pump center member extension 21. To hold the valve body 43 in position, a flange 46 is formed thereon and abuts against one side of center member extension 21 while a threaded collar 47 is engaged on the valve body on the opposite side of extension 21. To prevent rotation of the valve body 43 relative to center member 13, a pin 48 is transpierced through flange 46 and extends a small distance into the center member extension 21. To provide a passage through the valve 12 for the fluid which drives pump 11, a transverse bore 49 through the valve body 43 connects passage 22 of the pump center member 13 with an inlet fitting 51 at the end of extension 21. In order to vary the flow passage through bore 49 in response to fluid pressure control signal, a valve rod 52 is disposed coaxially within the axial bore 53 of the valve body 43. Valve rod 52, which is slidable within bore 53, has a central section 54 of tapered profile which is situated in the region of the cross bore 49. As the section 54 of valve rod 52 is of progressively increasing thickness towards one end thereof, axial movement of the valve rod systematically varies the flow aperture through passage 49.

Considering now the mechanism which operates valve rod 52 in response to control signals, the end of the rod at the larger diameter portion of section 54 extends axially through an enlarged section 56 of the bore through valve body 43. A compression spring 57 is disposed coaxially within valve body bore section 56 with one end of the spring bearing against a flange 58 at the end of the valve rod. The end of bore 56 is closed by a cap 59 threadably engaged on the end of the valve body 43, a gasket 61 being situated between two members. Axial movement of the valve rod 52 under the pressure of spring 57 is thus limited by the abutment of the end of the rod against the end cap 59 and the rod is proportioned so that at this limiting position the smallest diameter region of valve rod section 54 is situated at the cross bore 49. Thus when no counterforce is exerted against the action of spring 57, the control valve 12 provides a maximized flow passage for the entrance of driving fluid into pump 11.

To move the valve rod 52 axially for the purpose of varying the flow passage through the valve 12, an annular resilient piston 62 is disposed coaxially on the end of the rod adjacent flange 58 and on the side thereof opposite the end of spring 57. Piston 62 contacts the circumjacent wall of bore 56 so that high pressure fluid admitted to the end of bore 56 through a fitting 63 in end cap 59 will tend to drive the rod 52 against the force of spring 57. If sufficient fluid pressure is applied to the end of bore 56, through fitting 63, the valve rod 52 moves to position a thicker portion of the tapered section 54 at cross bore 49 and thereby reduces the flow passage therethrough. The extent of reduction of the flow passage through bore 49 is determined by the magnitude of the fluid pressure applied to fitting 63.

The basic mechanism as described above may be connected into fluid systems in any of a variety of ways in order to accomplish different results. The pump 11 is shown in FIG. 6 with connections for employing the apparatus as a lubricating oil pump in an engine of the class having a series of bearings 64 which are to be lubricated with oil from a reservoir 66 and which has a source of high pressure fluid such as an air compressor 67 as a component of the engine.

An outlet of compressor 67 is connected to the driving air input fitting 51 of the control valve 12 by a suitable conduit 68. A branched conduit 69 connects oil reservoir 66 with the oil input fittings 39 and 39' at opposite ends of the pump 11. An oil distribution conduit 71 is branched at one end to connect to the two oil outlet fittings 41 and 41' of pump 11 and is branched at the opposite end to connect to each of the bearings 64 or other mechanism to be lubricated. A return line 72 collects the oil from bearings 64 and transmits it back to reservoir 66. Drain fittings 32 of pump 11 are, in this example, connected to a suitably situated drain outlet 73.

In order to make the oil pressure within the output or distributing conduit 71 independent of variations in the pressure of the air from compressor 67 which drives pump 11 and independent of the rate of release through bearings 64, the control fluid input fitting 63 of valve 12 is coupled to the pump output line 71 by an additional conduit 70. Thus the flow passage through valve 12 is made responsive to the oil pressure in the outlet line 71. A slight increase of oil pressure in outlet line 71 will reduce the flow passage for driving air through control valve 12 and conversely a decrease of output pressure will increase the passage through control valve 12 so that the stystem stabilizes itself about a predetermined output pressure.

The above described lubricating oil circulation system utilizes a parallel connection of the two pumping chambers of pump 11 inasmuch as it is generally desired to provide a high flow rate in such systems. In other applications of the invention, however, the providing of a higher output pressure with a generally smaller flow rate may be desirable. Further alternate connections to the control valve 12 may be employed. Such a system is illustrated in FIG. 7 which shows the mechanism connected with other elements of an engine to function as a fuel pump. For this purpose, the input fitting 39 at a first end of pump 11 is coupled to the fuel reservoir 74 by conduit 76 and the output fitting 41 at the same end is coupled to the input fitting 39' at the second opposite end. The output fitting 41' at the second end is in turn connected to one or more fuel valves 77 of the engine through a fuel line 78. The pressure at which fuel is supplied to valve 77 is again maintained constant by connecting the control fitting 63 of valve 12 to the source of driving fluid, compressor 67, by an additional conduit 79. Control valve 12 thus functions to eliminate fluctuations in the pressure of the driving air as an increase will react through control fitting 63 to reduce the flow passage through the valve while a decrease in the pressure at fitting 63 will increase the flow passage. Provided that conditions at the fuel injection valves 77 remain unchanged, a constant flow of fuel to the combustion chambers 81 is maintained.

The systems described above do not exhaust the variations which may be made with respect to the connection of the pump 11 and control valve 12 into the fluid system of an engine or other apparatus. Valve 12 may, for example, be adjusted manually through a pressure line to a remotely situated control. Many modifications are possible within the scope of the invention and it is not intended to limit the invention except as defined in the following claims.

What is claimed is:

1. In combination with mechanism of the class having means associated therewith producing a fluid under pressure, a pumping device for supplying a liquid to components of said mechanism comprising, a pump having a liquid input passage and a liquid output passage and having a pumping element for translating said liquid from said input to said output passage, a fluid pressure operated motor having intake and exhaust passages with a driven element situated therebetween and operatively coupled to said pumping element of said pump, and a valve having a first fluid inlet passage receiving said fluid under pressure and having a fluid outlet coupled to said intake passage of said motor, said valve being of the class having a second fluid inlet and having a valve member movable to vary the flow passage between said first inlet and said outlet as a function of a variable fluid pressure applied to said second inlet for control purposes wherein said pump and said motor are contained within a common housing and comprised of a first member having a first pair of overlapping circular cavities therein, a second member disposed adjacent said first member and having a first pair of bores each coaxial with one of said first pair of cavities of said first member and of smaller diameter than said cavities, and a third member disposed adjacent said second member and having a second pair of overlapping circular cavities coaxial with said first pair of cavities and said bores, and wherein a first pair of gears are disposed of said first pair of cavities and engaged at the overlapping regions thereof and a second pair of gears are disposed in said second pair of cavities and engaged in the overlapping regions thereof, said first and second pair of gears being carried on a pair of rotatable shafts each journalled in a separate one of said bores of said second member, said first and second pairs of gears constituting said driven element of said motor and said pumping element of said pump, respectively.

2. A pumping device as defined in claim 1 wherein at least one drain passage communicates with each of said bores of said second member at an intermediate location along the length of said bores.

3. A pumping device as defined in claim 1 wherein the teeth of said first and second gears on each of said shafts are offset angularly with respect to each other.

4. In combination with mechanism of the class having means associated therewith producing a fluid under pressure, a pumping device for supplying a liquid to components of said mechanism comprising, a pump having a liquid input passage and a liquid output passage and having a pumping element for translating said liquid from said input to said output passage, a fluid pressure operated motor having intake and exhaust passages with a driven element situated therebetween and operatively coupled to said pumping element of said pump, and a valve having a first fluid inlet passage receiving said fluid under pressure and having a fluid outlet coupled to said intake passage of said motor, said valve being of the class having a second fluid inlet and having a valve member movable to vary the flow passage between said first inlet and said outlet as a function of a variable fluid pressure applied to said second inlet for control purposes wherein said pump and said motor are contained within a common housing comprised of a center member having a first pair of overlapping cylindrical cavities therein, a pair of second members disposed adjacent opposite sides of said center member and each having a pair of bores coaxial with said first pair of cavities of said center member and of smaller diameter than said cavities, and a third pair of members each disposed adjacent one of said second members at the opposite side thereof from said center member and each having a second pair of overlapping cylindrical cavities coaxial with said first pair of cavities and said bores, and wherein a first pair of gears are disposed in said first pair of cavities and engaged at the overlapping region thereof and a second pair of gears are disposed in the second pair of cavities of one of said third members and engaged at the overlapping region thereof and a third pair of gears are disposed in the second pair of cavities of the other of said third members and engaged at the overlapping region thereof, said first, second and third pairs of gears being carried on a pair of rotatable shafts journalled in said bores of said second members, each of said shafts having an axial passage extending therethrough to equalize pressures in each of said second pair of cavities.

References Cited

UNITED STATES PATENTS

| | | | |
|---|---|---|---|
| 2,277,569 | 3/1942 | Vickers | 103—45 |
| 2,062,250 | 11/1936 | Moller | 184—29 X |
| 2,362,106 | 11/1944 | Ungar et al. | 103—126 |
| 2,604,051 | 7/1952 | Johnson | 103—126 |
| 2,660,123 | 11/1953 | Vlachos | 103—118 |
| 2,814,254 | 11/1957 | Litzenberg | 103—87 |
| 2,910,948 | 11/1959 | Betzen | 103—118 |
| 2,937,807 | 5/1960 | Lorenz | 230—141 |

WILLIAM L. FREEH, *Primary Examiner.*

U.S. Cl. X.R.

103—118; 184—29